(12) United States Patent  
Cherubini et al.

(10) Patent No.: US 10,255,942 B2  
(45) Date of Patent: Apr. 9, 2019

(54) TAPE TRANSPORT CONTROL WITH FEEDBACK OF VELOCITY AND TENSION

(71) Applicant: International Business Machines Corporation, Armonk, NY (US)

(72) Inventors: Giovanni Cherubini, Rueschlikon (CH); Mark A. Lantz, Thalwil (CH); Angeliki Pantazi, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 15/244,508

(22) Filed: Aug. 23, 2016

(65) Prior Publication Data

US 2018/0061448 A1    Mar. 1, 2018

(51) Int. Cl.
| | |
|---|---|
| *G05B 11/06* | (2006.01) |
| *G11B 15/32* | (2006.01) |
| *G11B 15/43* | (2006.01) |
| *G11B 15/48* | (2006.01) |

(52) U.S. Cl.
CPC ............ *G11B 15/43* (2013.01); *G05B 11/06* (2013.01); *G11B 15/32* (2013.01); *G11B 15/48* (2013.01)

(58) Field of Classification Search
CPC ......... G11B 15/43; G11B 11/06; G11B 15/48; G11B 15/32
See application file for complete search history.

(56) References Cited

U.S. PATENT DOCUMENTS

| | | | |
|---|---|---|---|
| 7,876,521 B2 | 1/2011 | Cherubini et al. | |
| 8,587,892 B2 | 11/2013 | Eleftheriou et al. | |
| 9,159,347 B1 * | 10/2015 | Bui | G11B 5/00813 |
| 9,190,088 B2 * | 11/2015 | Lantz | G11B 15/602 |
| 9,564,161 B1 * | 2/2017 | Cherubini | G11B 5/588 |
| 2011/0102934 A1 * | 5/2011 | Bui | G11B 5/00813 |
| | | | 360/75 |

(Continued)

OTHER PUBLICATIONS

Cherubini et al., "Identification of MIMO transport systems in tape drives", 2013 IEEE/ASME International Conference on Advanced Intelligent Mechatronics (AIM), Jul. 9-12, 2013, Abstract only.

(Continued)

*Primary Examiner* — William A. Rivera  
(74) *Attorney, Agent, or Firm* — Scully, Scott, Murphy & Presser, P.C.; Daniel Morris, Esq.

(57) ABSTRACT

A tape transport control system with enhanced regulation of tape tension and velocity over the entire length of the tape. For example, a closed-loop control system for controlling a tape transport includes circuitry adapted to output a signal representing a tape velocity at a tape head, circuitry adapted to output a signal representing a tape velocity at the first tape reel and a signal representing a tape velocity at the second tape reel, circuitry adapted to output a signal representing a tape tension, and circuitry adapted to, based on the received signals, generate control signals to control the tape velocity at least at one of the tape head, the first tape reel, the second tape reel, and the tension of the tape, using controller gains that depend on a longitudinal position of the tape, and to implement a system transfer function that is approximately independent of the longitudinal position.

18 Claims, 4 Drawing Sheets

(56) References Cited

U.S. PATENT DOCUMENTS

| | | | |
|---|---|---|---|
| 2011/0102937 A1* | 5/2011 | Argumedo | G11B 5/584 360/77.12 |
| 2014/0312154 A1 | 10/2014 | Cherubini et al. | |
| 2015/0009590 A1* | 1/2015 | Argumedo | G11B 5/584 360/77.12 |
| 2015/0325262 A1 | 11/2015 | Argumedo et al. | |
| 2018/0061448 A1* | 3/2018 | Cherubini | G11B 15/43 |
| 2018/0240484 A1* | 8/2018 | Bui | G11B 5/5926 |

OTHER PUBLICATIONS

Pantazi et al., "Tape transport control based on sensor fusion", Preprints of the 19th World Congress, The International Federation of Automatic Control, Cape Town, South Africa, Aug. 24-29, 2014, pp. 6849-6855.

* cited by examiner

TAPE TRANSPORT CONTROL WITH FEEDBACK OF VELOCITY AND TENSION

BACKGROUND

The present application relates to techniques for controlling a tape transport using feedback of velocity and tension using controllers that depend on the longitudinal tape position.

Demand for cost effective storage solutions is being driven by the explosive growth in the rate at which data is being created. Tape systems are well suited to address this demand due to their low total cost of ownership compared to other storage technologies. However, the continued success of tape technology depends on maintaining its cost advantage over other storage technologies, and hence it is necessary to continue scaling the cartridge capacity and hence the cost per GB of tape systems at least as quickly as competing technologies, such as hard disk drive (HDD) storage systems.

Historically, the capacity scaling of tape systems at a roughly 40% compound annual growth rate (CAGR) has been enabled through continuous incremental improvements in track and linear densities, format efficiency, and increases in tape length. Although the majority of capacity improvements have been achieved through areal density scaling, tape length increases that are enabled by thinner tape media have also been an important contributor. For example, the capacity of the linear tape open (LTO) tape format was increased from 200 GB in generation 2 to 6 TB in the latest generation 7 format. Approximately 1.58 times of this 30 times capacity increase was enabled by an increase in tape length from 609 m in generation 2 to 960 m in generation 7. This increase in tape length required a reduction in tape thickness from 8.9 µm in generation 2 to 5.6 µm in generation 7 to maintain a constant cartridge form factor. The International Storage Industry Consortium (INSIC) 2012 Tape Technology Roadmap projects that in the future this trend will continue with tape thickness projected to reach 4.0 µm by the 2022 time frame (INSIC (2012)).

The tape transport, also known as reel-to-reel, control system of a tape drive has the task of determining the input motor currents that are applied to control the tape motion as the tape is streamed over the head during write and read operations. To achieve reliable recording performance, it is important to keep as small as possible the fluctuations of the tape velocity and of the tape tension around constant predetermined values. Previous work on reel-to-reel control has focused mainly on improving velocity control, as in Pantazi et al. (2014), where the control system for each reel consists of a feedback controller for tape-velocity control and a feedforward controller for tape-tension control. The trend of decreasing tape thickness has created a need to improve the performance of the reel-to-reel control system and in particular, to improve the control of the tension to avoid breaking the tape. In addition, variations in tape tension lead to variations in the tape's lateral dimension, so-called tape dimensional stability, that limit the track density that can be recorded on the tape. Hence, improvements in tension control may translate into improvements in tape dimensional stability that in turn may enable increases in track density.

Accordingly, a need arises for techniques by which a tape transport control system may provide enhanced regulation of tape tension and velocity over the entire length of the tape, thus reducing mechanical stress and enabling reduction in tape thickness.

SUMMARY

Embodiments of the present invention may provide a tape transport control system with enhanced regulation of tape tension and velocity over the entire length of the tape, thus reducing mechanical stress and enabling reduction in tape thickness.

For example, in an embodiment of the present invention, a closed-loop control system for controlling a tape transport from a first tape reel to a second tape reel in a tape drive system, may comprise circuitry adapted to output a signal representing a tape velocity at a tape head, circuitry adapted to output a signal representing a tape velocity at the first tape reel, circuitry adapted to output a signal representing a tape velocity at the second tape reel, circuitry adapted to output a signal representing the tension of the tape, and circuitry adapted to receive the signals representing the tape velocity at the tape head, first tape reel, second tape reel, and the tension of the tape, and based on the received signals, generate control signals to control the tape velocity at least at one of the tape head, the first tape reel, the second tape reel, and the tension of the tape, using controller gains that depend on a longitudinal position of the tape, and to implement a system transfer function that is approximately independent of the longitudinal position.

For example, in an embodiment, the circuitry adapted to output a signal representing a tape velocity at a tape head may comprise at least one servo reader in the tape head outputting a signal read from a tape and servo circuitry adapted to receive the signal and output the signal representing the tape velocity at the tape head based on the signal read from the tape. The system may further comprise circuitry adapted to select signals input to the circuitry adapted to generate control signals based on a direction of tape motion. The circuitry adapted to select signals may comprise circuitry adapted to select the signal representing the tape velocity at the tape head as an input signal to generate a control signal for a supply reel and circuitry adapted to select a signal representing a tape velocity at a take-up reel as an input signal to generate a control signal for the take-up reel, wherein either the first tape reel or the second tape reel are the supply reel or the take-up reel, depending on a direction of tape motion. The signal representing the tape tension may be measured at a roller in a path of the tape. The tape tension may be measured using a strain-gauge sensor mounted on the roller.

For example, in an embodiment of the present invention, a tape transport system may comprise a first tape reel having a first motor, a second tape reel having a second motor, and a tape head, circuitry adapted to output a signal representing a tape velocity at the tape head, circuitry adapted to output a signal representing a tape velocity at the first tape reel, circuitry adapted to output a signal representing a tape velocity at the second tape reel, and circuitry adapted to receive the signals representing the tape velocity at the tape head, first tape reel, and second tape reel, and based on the received signals, generate control signals to be output to the first motor and the second motor to control the tape velocity at the tape head, the tape velocity at the first tape reel, the tape velocity at the second tape reel, and the tension of the tape, using controller gains that depend on a longitudinal position of the tape, and to implement a system transfer function that is approximately independent of the longitudinal position.

For example, in an embodiment of the present invention, in a tape transport system, a method may comprise generating a signal representing a tape velocity at a tape head, generating a signal representing a tape velocity at the first tape reel, generating a signal representing a tape velocity at the second tape reel, and generating control signals to control the tape velocity at the tape head, the tape velocity at the first tape reel, the tape velocity at the second tape reel, and the tension of the tape, using controller gains that depend on a longitudinal position of the tape, and to implement a system transfer function that is approximately independent of the longitudinal position, based on the signals representing the tape velocity at the tape head, first tape reel, and second tape reel, and based on the received signals. The method may further comprise generating a signal representing a tension of the tape, and generating control signals to control the tension of the tape based on the received signal representing the tension of the tape.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present disclosure provide a tape transport control system with enhanced regulation of tape tension and velocity over the entire length of the tape, thus reducing mechanical stress and enabling reduction in tape thickness. For example, a tape transport control scheme with feedback of velocity and tension may use p-type controllers that depend on the longitudinal tape position. The time-varying characteristics of the tape transport system may be taken into account to design the velocity and tension feedback control system. Analytical expressions may be obtained for the p-type controller gains, for which all transfer functions may become essentially independent of longitudinal position. More specifically, the closed-loop transfer functions for tension and velocity may exhibit a negligible bandwidth variation as the tape moves from the supply reel to the take-up reel. Consequently, the dynamic characteristics of the tape transport system may also become essentially independent of the tape longitudinal position, which may mitigate the tape mechanical stress over the entire length of tape. In a tape drive, feedback of tension may be provided by a tension sensor incorporated into the tape transport system, or by a function of the difference of the lateral head positions estimated by the servo channels processing read back signals that are read by servo readers from adjacent servo bands.

Figure 1:
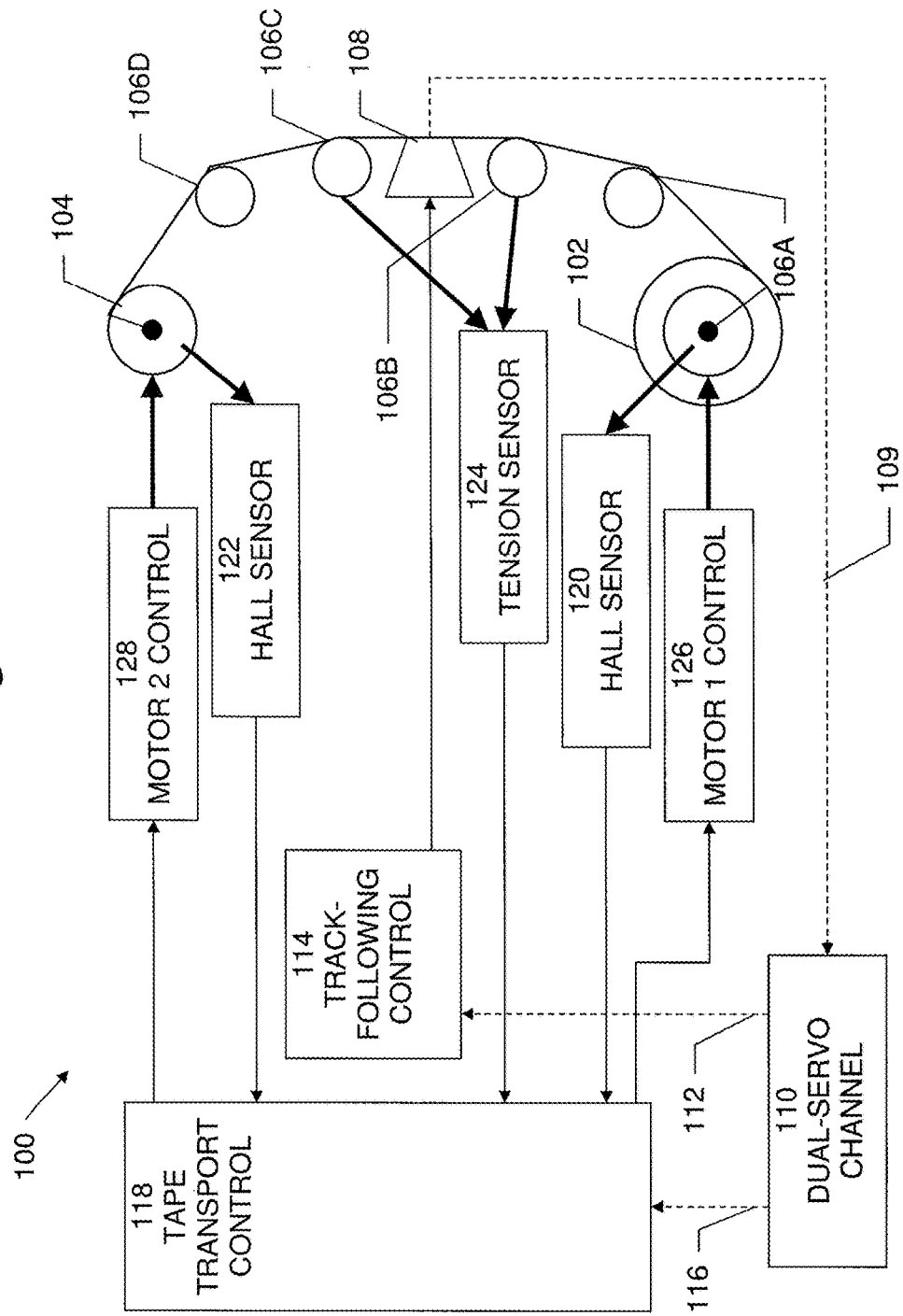
FIG. 1 is an exemplary block diagram of a tape transport mechanism and track-following control systems.

A block diagram of an exemplary tape transport mechanism and track-following control systems in a tape drive is shown in FIG. 1. For motion in the forward direction, the tape may be transported from a file (or outboard or number 1) reel 102, acting as a supply reel, to the machine (or inboard or number 2) reel 104, acting as a take-up reel, through the tape path consisting of rollers 106A-D and the read/write tape head 108. In the reverse direction, the roles of the reel 1 102 and reel 2 104 may be reversed. Read/write operations may be performed in contact with the tape by the read/write elements 108 for the servo 109 and data channels that are included in the tape head. A dual synchronous servo channel 110 may provide estimate of the primary tape velocity, tape longitudinal position (LPOS), and head lateral position, which may be derived from servo signals 109 that are generated by two servo readers in the tape head 108. The servo readers may read signals from servo tracks or other servo recorded areas on the tape, or the servo readers may read the data signals, and the servo channel circuitry 110 may derive servo signals therefrom.

Estimates of tape velocity and head position 112 may be provided to a track-following servomechanism 114. Likewise, estimates of tape velocity, head position, and LPOS 116 may be supplied to the tape transport control system 118. Tape transport control system 118 may process the received tape velocity, head position, and LPOS 116 and generate control signals output to motor control circuitry, such as motor 1 control 126 and motor 2 control 128. Hall-effect sensors 120, 122 may provide measures of the rotation rate of each reel 102, 104 and may be used to obtain additional secondary tape velocity information from the individual reels. The secondary tape velocity information may be used to achieve proper tape transport operation in the absence of valid parameter estimates from the dual servo channel 110, for example during tape acceleration, or to enhance tape transport performance. Furthermore, estimates of the tape tension may be provided by two strain-gauge sensors 124 that are mounted on two of the rollers, such as rollers 106B, 106C, in the tape path.

Figure 2:
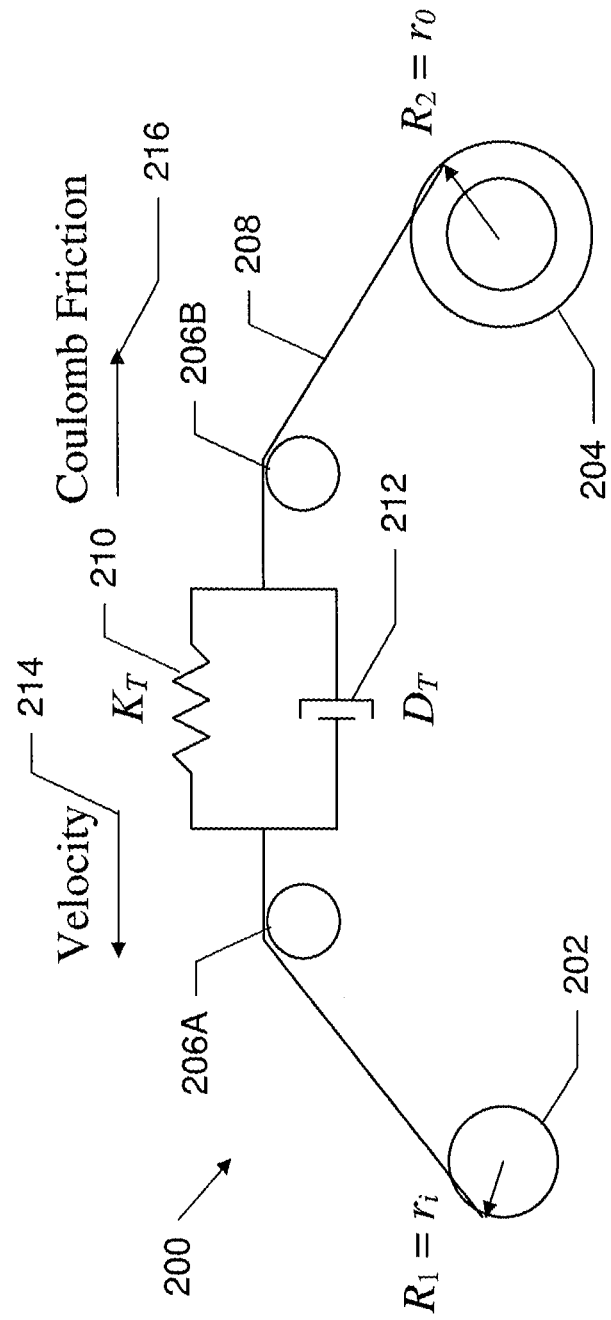
FIG. 2 is an exemplary simplified mechanical model of a reel-to-reel tape system.

An exemplary simplified mechanical model of a reel-to-reel tape system 200 is shown in FIG. 2. System 200 may include reel 1 202, reel 2 204, rollers 206A, 206B, and tape 208. System 200 may further include components representing the tape spring constant $K_T$ 210 and the tape damper coefficient $D_T$ 212. In addition, parameters such as tape velocity 214 and Coulomb Friction 216 may be included in the model. System 200 may be modeled mathematically using a state-space description of the reel-to-reel system as a discrete linear two-input two-output (MIMO) system. A state vector for system 200 may be defined as:

$$x(t) = \begin{bmatrix} x_1(t) \\ \dot{x}_1(t) \\ x_2(t) \\ \dot{x}_2(t) \end{bmatrix} = \begin{bmatrix} \text{reel 1 position} \\ \text{reel 1 velocity} \\ \text{reel 2 position} \\ \text{reel 2 velocity} \end{bmatrix}.$$

The reel inertia may be modeled as, for example, for the first reel $$J_1(R_1) = J_{1,motor} + J_{1,clutch} + \pi w \rho \left( \frac{R_1^4 - R_o^4}{2} \right),$$

and for the second reel $$J_2(R_2) = J_{2,motor} + J_{2,clutch} + \pi w \rho \left( \frac{R_2^4 - R_o^4}{2} \right).$$

Then the system may be modeled, for example, as a fourth-order reel-to-reel system as:

$$\frac{J_1}{R_1}\ddot{x}_1(t) = -\frac{\beta_1}{R_1}\dot{x}_1(t) -$$

$$R_1(1+\mu)\{K_T[x_1(t)-x_2(t)] + D_T[\dot{x}_1(t)-\dot{x}_2(t)]\} + K_1 u_1(t), \text{ and}$$

$$\frac{J_2}{R_2}\ddot{x}_2(t) = -\frac{\beta_2}{R_2}\dot{x}_2(t) + R_2\{K_T[x_1(t)-x_2(t)] + D_T[\dot{x}_1(t)-\dot{x}_2(t)]\} + K_2 u_2(t),$$

where $u_1$ and $u_2$ are the control signals for reel 1 and reel 2, respectively.

Then a state-space model of the linear system, at a given LPOS and tape velocity in the forward direction may be:

$$\dot{x}(t) = \begin{bmatrix} 0 & 1 & 0 & 0 \\ -\frac{R_1^2 K_T(1+\mu)}{J_1} & -\frac{\beta_1}{J_1} - \frac{R_1^2 D_T(1+\mu)}{J_1} & \frac{R_1^2 K_T(1+\mu)}{J_1} & \frac{R_1^2 D_T(1+\mu)}{J_1} \\ 0 & 0 & 0 & 1 \\ \frac{R_2^2 K_T}{J_2} & \frac{R_2^2 D_T}{J_2} & -\frac{R_2^2 K_T}{J_2} & -\frac{\beta_2}{J_2} - \frac{R_2^2 D_T}{J_2} \end{bmatrix} x(t) + \begin{bmatrix} 0 & 0 \\ \frac{R_1 K_1}{J_1} & 0 \\ 0 & 0 \\ 0 & \frac{R_2 K_2}{J_2} \end{bmatrix} u(t)$$

and $y(t)\begin{bmatrix} 0 & 1 & 0 & 0 \\ 0 & 0 & 0 & 1 \\ K_T & D_T & -K_T & -D_T \end{bmatrix} x(t).$ The tape-transport parameter values depend on LPOS and tape velocity and are obtained by the identification procedure in the frequency domain based on the application of chirp signals to the control efforts.

A number of parameters may be utilized in analyzing performance of the system. For example, ρ may be the tape density [Kg/m], ε may be the tape thickness [m], w may be the tape width [m], $R_o$ may be the radius of empty reel [m], $R_f$ may be the radius of full reel [m], $K_1$, $K_2$ may be the transducer gains [N m/A], $K_T$ may be the tape spring constant [N/m], $D_T$ may be the tape damper coefficient [N s/m], $\beta_1$, $\beta_2$ may be the motor viscous damping coefficients [N m s], μ may be the Coulomb friction coefficient, $R_1$ and $R_2$ may be the radii, and $J_1$ and $J_2$ may be the moments of inertia of reel 1 and reel 2, respectively. Alternatively, $r_i$ and $r_o$ may be the radii, $u_i$ and $u_o$ are the control signals and $J_i$ and $J_o$ may be the moments of inertia of the machine reel and file reel, respectively.

Figure 3:
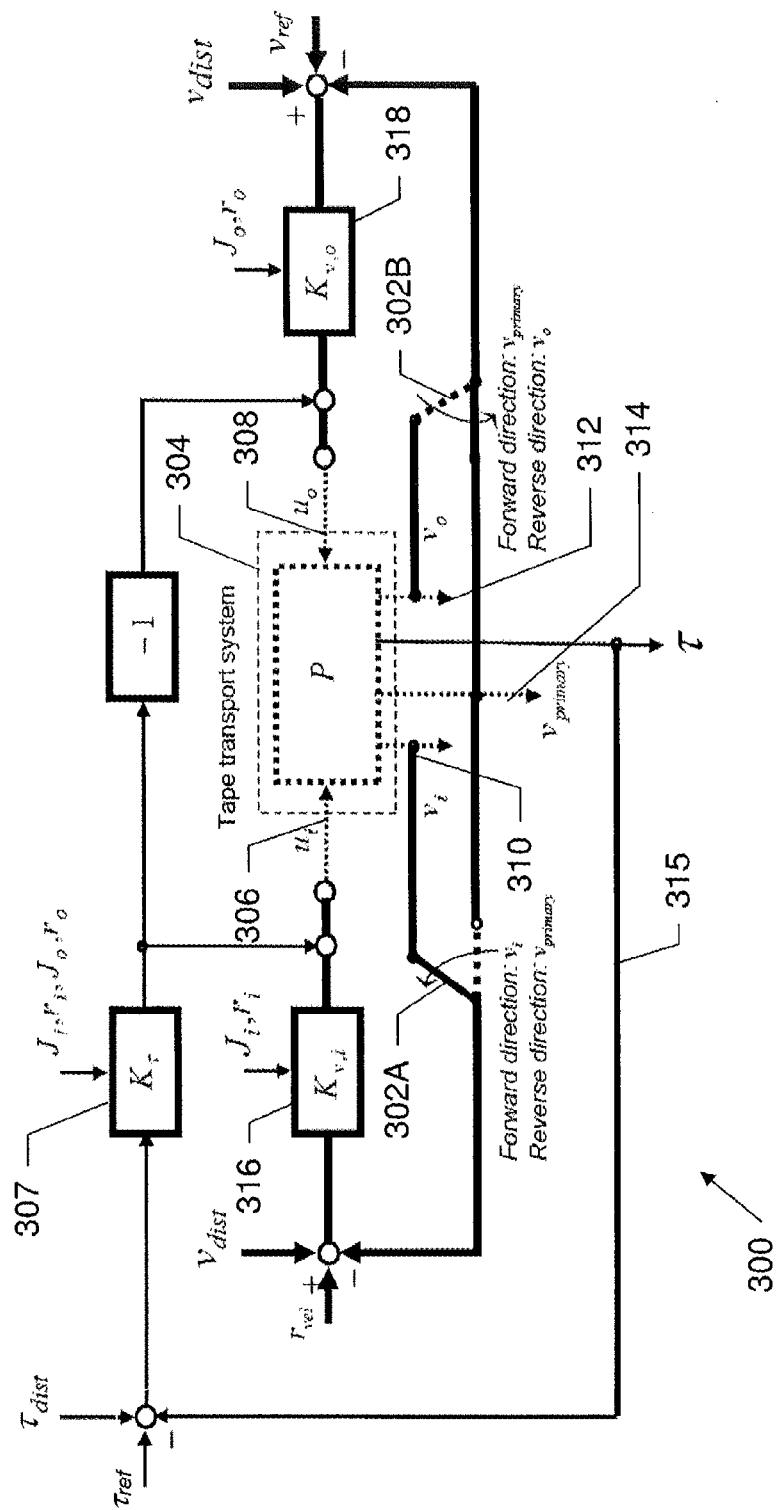
FIG. 3 is an exemplary block diagram of a tape transport control system.

A model of an exemplary tape transport control system 300 with feedback of primary velocity, secondary inboard and outboard velocities, and tension is shown in FIG. 3. It is best viewed in conjunction with FIG. 1. The tape transport control system may include selective feedback of tape velocity information, which may yield a significant performance improvement over a conventional system with feedback of primary velocity only. In this example, system 300 may include feedback selectors 302A, 302B, which may provide selective feedback of tape velocity information. Tape transport system 304 may include inputs, such as control signals $u_i$ 306 for reel 1 and $u_o$ 308 for reel 2. Tape transport system 304 may also include outputs, such as $v_i$ 310 for the velocity of reel 1 from Hall sensor 102, shown in FIG. 1, $v_o$ 312 for the velocity of reel 2 from Hall sensor 102, $v_{primary}$ 314 for the primary tape velocity from servo signals 109 that are generated by two servo readers in the tape head 108, and tape tension τ 315 from a strain-gauge sensor that is mounted on one of the rollers in the tape path.

The feedback of velocity may take into account the direction of tape motion by selecting the velocity feedback for either the supply reel or for the take-up reel as the primary velocity input and selecting the velocity measurement provided by the Hall sensor as the velocity input at the other reel. For example, in the forward direction, feedback selectors 302A, 302B may be configured to select $v_{primary}$ 314 as an input to control signal $u_o$ 308 for reel 2 (the supply reel in the forward direction) and $v_i$ 310 as an input to control signal $u_i$ 306 for reel 1 (the take-up reel in the forward direction). Likewise, in the reverse direction, feedback selectors 302A, 302B may be configured to select $v_o$ 312 as an input to control signal $u_o$ 308 for reel 2 (the take-up reel in the reverse direction) and $v_{primary}$ 314 as an input to control signal $u_i$ 306 for reel 1 (the supply reel in the reverse direction).

System 300 may also include feedback of tape tension as well. In particular, time-varying proportional (p-type) controllers may be used for the control of tension, tape velocity at the supply reel, and tape velocity at the take-up reel. For example, p-type controllers $K_{v,i}$ 316 and $K_{v,o}$ 318, may be determined depending on parameter values such as $J_i$, $r_i$ and $J_o$, $r_o$, respectively. Utilization of time-varying proportional controllers that depend directly on the longitudinal position, or indirectly through tape-transport parameters such as reel moment of inertia and reel radius, may provide transfer functions from the input motor currents to the controlled variables, and from the velocity and tension disturbances to the velocity and tension errors, respectively, that are essentially independent of the tape longitudinal position.

From the state-space model of the linear tape transport system introduced in the previous section, assuming the motor viscous friction coefficients $\beta_1$ and $\beta_2$, and the Coulomb friction coefficient μ can be considered negligible, the input-output relationship of the tape transport plant P may be given by:

$$P(s) = H(sI - F)^{-1} G \approx$$

$$\frac{1}{\Gamma(s)} \begin{bmatrix} \frac{r_i K_i s}{J_i}\left(s^2 + \frac{r_o^2}{J_o}D_T s + \frac{r_o^2}{J_o}K_T\right) & \frac{r_o K_o s}{J_o}\left(\frac{r_i^2}{J_i}D_T s + \frac{r_i^2}{J_i}K_T\right) \\ \frac{r_i K_i s}{J_i}\left(\frac{r_o^2}{J_o}D_T s + \frac{r_o^2}{J_o}K_T\right) & \frac{r_o K_o s}{J_o}\left(s^2 + \frac{r_i^2}{J_i}D_T s + \frac{r_i^2}{J_i}K_T\right) \\ \frac{r_i K_i s^2}{J_i}\left(D_T s + \frac{r_o^2}{J_o}K_T\right) & -\frac{r_o K_o s^2}{J_o}(D_T s + K_T) \end{bmatrix},$$

where

-continued $$\Gamma(s) = s^2 \left[ s^2 + \left( \frac{r_i^2}{J_i} + \frac{r_o^2}{J_o} \right) D_T s + \left( \frac{r_i^2}{J_i} + \frac{r_o^2}{J_o} \right) K_T \right].$$

By using the expression for P(s), it is possible to evaluate closed-form expressions for the system transfer functions. First consider the transfer functions for inboard and outboard velocities. Proportional type (p-type) controllers $K_{v,i}$ 316 and $K_{v,o}$ 318, which correspond to the controllers currently implemented for velocity feedback, may be determined depending on the longitudinal position, as a function of tape-transport parameters such as $J_i$, $r_i$ and $J_o$, $r_o$, respectively. For example, with $$K_{v,i} = g_v \frac{J_i}{r_i K_i} \text{ and } K_{v,o} = g_v \frac{J_o}{r_o K_o},$$

where $g_v$ is a positive constant, the disturbance-to-error and reference-to-output transfer functions for the inboard velocity match the corresponding transfer functions for the outboard velocity, such as: $G_{e_i,v_{dist}}(s) = G_{e_o,v_{dist}}(s)$ and $G_{v_i,v_{ref}}(s) = G_{v_o,v_{ref}}(s)$. Furthermore, the transfer functions become approximately independent of longitudinal position. For example, the disturbance-to-error transfer functions may be expressed as:

$$G_{e_i,v_{dist}}(s) = G_{e_o,v_{dist}}(s) = \frac{s^6 + \left[ g_v + 2D_T \left( \frac{r_i^2}{J_i} + \frac{r_o^2}{J_o} \right) \right] s^5 + O(s^4)}{s^6 + 2 \left[ g_v + D_T \left( \frac{r_i^2}{J_i} + \frac{r_o^2}{J_o} \right) \right] s^5 + O(s^4)}.$$

Likewise, for $K_\tau$ 307, with $$K_\tau = g_T \frac{1}{\frac{r_i K_i}{J_i} + \frac{r_o K_o}{J_o}},$$

where $g_\tau$ is a positive constant, the longitudinal-position dependency of the highest-order coefficients at the denominator of the reference-to-output and disturbance-to-error transfer functions for the tension may be substantially reduced. For example, the disturbance-to-error transfer function for the tension may be expressed as:

$$G_{e_T,T_{dist}}(s) = \frac{s^6 + 2 \left[ g_v + \left( \frac{r_i^2}{J_i} + \frac{r_o^2}{J_o} \right) D_T \right] s^5 + O(s^4)}{s^6 + 2 \left[ g_v + \left( \frac{r_i^2}{J_i} + \frac{r_o^2}{J_o} + \frac{g_T}{2} \right) D_T \right] s^5 + O(s^4)}.$$

Accordingly, the overall system transfer functions may be considered to be approximately independent of the longitudinal position of the tape.

Figure 4:
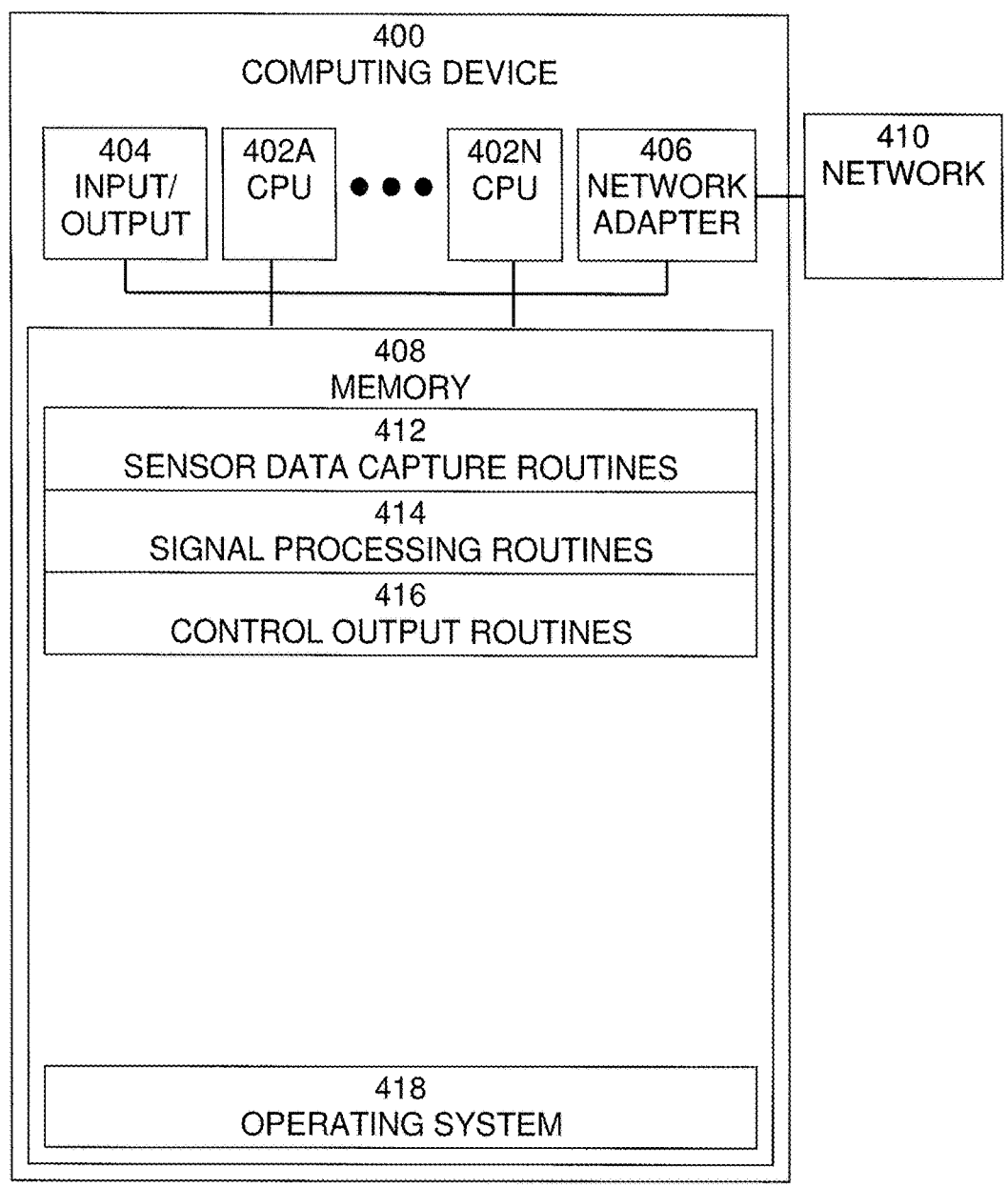
FIG. 4 is an exemplary block diagram of a computer system in which processes involved in the embodiments described herein may be implemented.

An exemplary block diagram of a computing device 400, in which processes involved in the embodiments described herein may be implemented, is shown in FIG. 4. Computing device 400 may be a programmed general-purpose computer system, such as an embedded processor, system on a chip, personal computer, workstation, server system, and minicomputer or mainframe computer, or system 400 may be included in a special purpose processing device, such as a field-programmable gate array (FPGA), custom or semi-custom application specific integrated circuit (ASIC), or other processing device. Computing device 400 may include one or more processors (CPUs) 402A-402N, input/output circuitry 404, network adapter 406, and memory 408. CPUs 402A-402N execute program instructions in order to carry out the functions of the present invention. FIG. 4 illustrates an embodiment in which computing device 400 is implemented as a single multi-processor system, in which multiple processors 402A-402N share system resources, such as memory 408, input/output circuitry 404, and network adapter 406. However, the present invention also contemplates embodiments in which computing device 400 is implemented in other configurations.

Input/output circuitry 404 provides the capability to input data to, or output data from, computing device 400. For example, input/output circuitry may include input devices, such as keyboards, mice, touchpads, trackballs, scanners, analog to digital converters, etc., output devices, such as video adapters, monitors, printers, digital to analog converters, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computing device 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computing device 400 is programmed to perform. In the example shown in FIG. 4, exemplary memory contents are shown representing routines and data for embodiments of the processes described above, such as processes that may be performed by tape transport control 118, shown in FIG. 1. However, one of skill in the art would recognize that these routines, along with the memory contents related to those routines, may not be included on one system or device, but rather may be distributed among a plurality of systems or devices, based on well-known engineering considerations. The present invention contemplates any and all such arrangements.

In the example shown in FIG. 4, memory 408 may include sensor data capture routines 412, signal processing routines 414, control output routines 416, and operating system 418. For example, sensor data capture routines cell data 412 may include routines that interact with one or more sensors, such as Hall sensors 120, 122, and tension sensors 124, shown in FIG. 1. Signal processing routines 614 may include routines to process the received signal data in order to control operation of a tape drive system 100, shown in FIG. 1. Control output routines 416 may include routines to generate and output control signals, such as control signals for motor 1 control 126, and motor 2 control 128, shown in FIG. 1. Operating system 418 provides overall system functionality.

As shown in FIG. 4, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A closed-loop control system for controlling a tape transport from a first tape reel to a second tape reel in a tape drive system, comprising:
    circuitry adapted to output one or more signals representing at least one of a tape velocity at a tape head, a tape velocity at the first tape reel, a tape velocity at the second tape reel, and a tape tension; and
    circuitry adapted to receive the one or more signals representing the tape velocity at the tape head, first tape reel, second tape reel, and the signal representing tape tension, and based on the received signals, generate control signals to control the tape velocity at least at one of the tape head, the first tape reel, the second tape reel and the tension of the tape, using controller gains that depend on a longitudinal position of the tape, and to implement at least one system transfer function that is approximately independent of the longitudinal position.

2. The system of claim 1, wherein the circuitry adapted to output a signal representing a tape velocity at a tape head comprises:
    at least one servo reader in the tape head outputting a signal read from a tape; and
    servo circuitry adapted to receive the signal and output the signal representing the tape velocity at the tape head based on the signal read from the tape.

3. The system of claim 1, further comprising
    circuitry adapted to select signals input to the circuitry adapted to generate control signals based on a direction of tape motion.

4. The system of claim 3, wherein the circuitry adapted to select signals comprises:
    circuitry adapted to select the signal representing the tape velocity at the tape head as an input signal to generate a control signal for a supply reel; and
    circuitry adapted to select a signal representing a tape velocity at a take-up reel as an input signal to generate a control signal for the take-up reel, wherein either the first tape reel or the second tape reel is the supply reel or the take-up reel, depending on a direction of tape motion.

5. The system of claim 1, wherein the signal representing the tape tension is generated at a roller in a path of the tape.

6. The system of claim 5, wherein the tape tension is measured using a strain-gauge sensor mounted on the roller.

7. A tape transport system, comprising:
    a first tape reel having a first motor, a second tape reel having a second motor, and a tape head;
    circuitry adapted to output one or more signals representing at least one of a tape velocity at a tape head, a tape velocity at the first tape reel, a tape velocity at the second tape reel, and a tape tension;
    circuitry adapted to receive the signals representing the tape velocity at the tape head, first tape reel, and second tape reel, and based on the received signals, generate control signals to be output to the first motor and the second motor to control at least at one of the tape head, the first tape reel, the second tape reel and the tension of the tape, using controller gains that depend on a longitudinal position of the tape, and to implement a system transfer function that is approximately independent of the longitudinal position.

8. The system of claim 7, wherein the circuitry adapted to output a signal representing a tape velocity at a tape head comprises:
    at least one servo reader in the tape head outputting a signal read from a tape; and
    servo circuitry adapted to receive the signal and output the signal representing the tape velocity at the tape head based on the signal read from the tape.

9. The system of claim 7, further comprising
    circuitry adapted to select signals input to the circuitry adapted to generate control signals based on a direction of tape motion.

10. The system of claim 9, wherein the circuitry adapted to select signals comprises:
    circuitry adapted to select the signal representing the tape velocity at the tape head as an input signal to generate a control signal for a supply reel; and
    circuitry adapted to select a signal representing a tape velocity at a take-up reel as an input signal to generate a control signal for the take-up reel, wherein either the first tape reel or the second tape reel are the supply reel or the take-up reel, depending on a direction of tape motion.

11. The system of claim 7, wherein the signal representing the tape tension is generated at a roller in a path of the tape.

12. The system of claim 11, wherein the tape tension is measured using a strain-gauge sensor mounted on the roller.

13. In a tape transport system, a method comprising:
    generating one or more signals representing at least one of a tape velocity at a tape head, a tape velocity at the first tape reel, a tape velocity at the second tape reel, and a tape tension; and
    generating control signals to control the tape velocity at least at one of the tape head, the first tape reel, the second tape reel and the tension of the tape, using controller gains that depend on a longitudinal position of the tape, and to implement a system transfer function that is approximately independent of the longitudinal position, based on the signals representing the tape velocity at the tape head, first tape reel, and second tape reel, and on the tape tension.

14. The method of claim 13, wherein the signal representing a tape velocity at a tape head is generated by:
outputting a signal read from a tape; and
outputting the signal representing the tape velocity at the tape head based on the signal read from the tape.

15. The method of claim 13, further comprising
selecting signals to generate the control signals based on a direction of tape motion.

16. The method of claim 15, wherein the signals are selected by:
selecting the signal representing the tape velocity at the tape head as an input signal to generate a control signal for a supply reel; and
selecting a signal representing a tape velocity at a take-up reel as an input signal to generate a control signal for the take-up reel, wherein either the first tape reel or the second tape reel are the supply reel or the take-up reel, depending on a direction of tape motion.

17. The method of claim 13, further comprising generating the signal representing the tape tension at a roller in a path of the tape.

18. The method of claim 17, further comprising measuring the tape tension using a strain-gauge sensor mounted on the roller.

* * * * *